United States Patent [19]

Bacher et al.

[11] Patent Number: 4,934,503

[45] Date of Patent: Jun. 19, 1990

[54] CLUTCH CONTROL DEVICE SUITABLE FOR AN AUTOMOBILE VEHICLE

[75] Inventors: Michel Bacher, Andilly, France; Cecilio Martinez Corral, Madrid, Spain

[73] Assignee: Valeo, Paris, France

[21] Appl. No.: 275,530

[22] Filed: Nov. 23, 1988

[30] Foreign Application Priority Data

Nov. 25, 1987 [FR] France ................ 87 16331

[51] Int. Cl.$^5$ .............................................. F16D 19/00
[52] U.S. Cl. .............................. 192/93 A; 192/111 A; 74/506
[58] Field of Search .................. 192/93 A, 98, 111 A; 74/506

[56] References Cited

U.S. PATENT DOCUMENTS

| | | | |
|---|---|---|---|
| 20,508 | 9/1937 | Vail | 192/93 A |
| 136,581 | 3/1973 | Browne | 74/506 |
| 2,521,607 | 7/1950 | Rohn | 192/97 |
| 2,931,476 | 4/1960 | Zeidler et al. | 192/93 A |
| 3,071,228 | 1/1963 | Zeidler | 192/110 |
| 3,876,049 | 4/1975 | Linn et al. | 192/111 A |
| 4,144,957 | 3/1979 | de Gennes | 192/98 |
| 4,310,083 | 1/1982 | Maucher | 192/18 R |
| 4,524,853 | 6/1985 | Nagai | 192/18 R |
| 4,614,130 | 9/1986 | Heismann et al. | 74/506 |
| 4,648,498 | 3/1987 | Herbulot et al. | 192/94 |

FOREIGN PATENT DOCUMENTS

| | | |
|---|---|---|
| 199642 | 10/1986 | European Pat. Off. . |
| 590140 | 12/1933 | Fed. Rep. of Germany . |
| 686284 | 1/1940 | Fed. Rep. of Germany . |
| 3534935 | 4/1987 | Fed. Rep. of Germany . |
| 1018329 | 1/1953 | France . |
| 1467848 | 2/1967 | France . |
| 1587732 | 9/1968 | France . |
| 2499646 | 4/1986 | France . |
| 57-202025 | 12/1982 | Japan . |
| 438860 | 12/1967 | Switzerland . |
| 638876 | 10/1983 | Switzerland . |
| 372091 | 5/1932 | United Kingdom . |

Primary Examiner—Rodney H. Bonck
Assistant Examiner—Nicholas Whitelaw
Attorney, Agent, or Firm—Charles E. Brown; Charles A. Brown

[57] ABSTRACT

The invention relates to a clutch control device comprising a driven part entrained by a driving part. According to the invention, the driving and driven parts are hollow, and are mounted coaxially. The driving part carries engagement structure and is fixed in translation, whereas the driven part is movable in translation and fixed in rotation. The driven part is mounted in the axial prolongation of the driving part and carries on its inner periphery a support portion for attachment of the clutch release element.

11 Claims, 3 Drawing Sheets

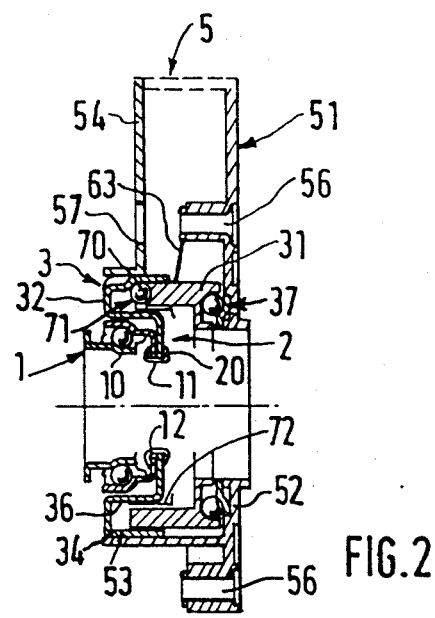

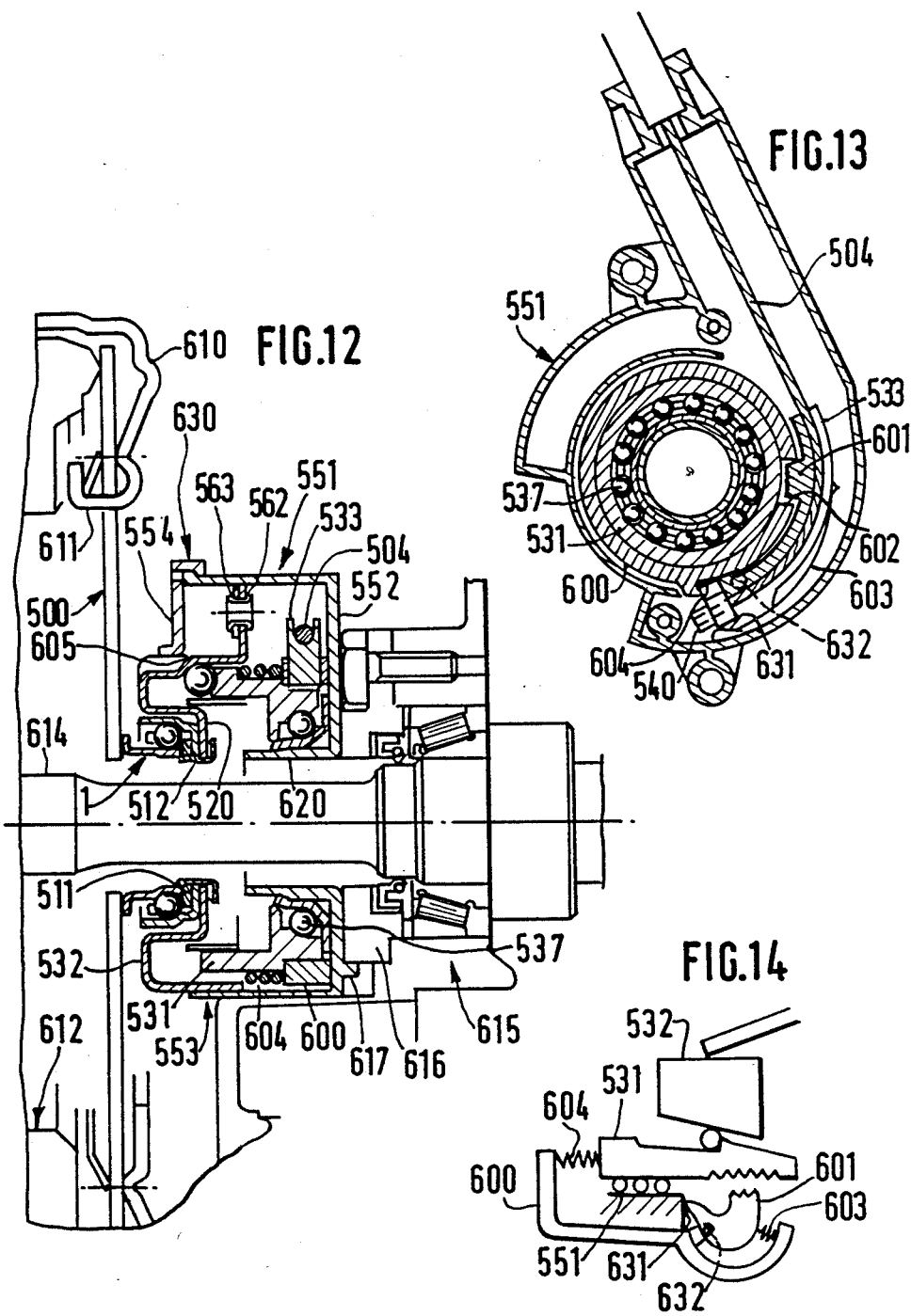

4,934,503

CLUTCH CONTROL DEVICE SUITABLE FOR AN AUTOMOBILE VEHICLE

FIELD OF THE INVENTION

The present invention relates to a control device for a clutch, especially for an automobile vehicle, of the kind intended to operate a clutch release element adapted to act on the clutch release bearing of a clutch, and comprising supporting means for the clutch release element, adapted to be mounted on a translationally fixed support, and control means for the said clutch release element. Usually the control means consist of a clutch release fork operated by a cable connected to the clutch pedal.

The supporting means generally consist of a guide tube surrounding the input shaft of the gearbox, along which a clutch release bearing forming the clutch release element slides. Both the fork and the guide tube are mounted on the gearbox case.

As a result of this arrangement, the size of the clutch release element is determined by the guide tube and, since the fork is separate from the guide tube, numerous stages are necessary during mounting.

To simplify mounting, the device may be designed as a hydraulic sub-assembly, for example in the form of a hydraulic jack having a cylinder and piston. Such an arrangement is expensive because of the seals which have to be provided and, in addition, problems with venting have to be resolved during mounting.

BACKGROUND OF THE INVENTION

It has already been proposed when the clutch is located at the end of the entrainment assembly, as described in European Patent No. EP-A-O 199 642, to house the control means inside a grooved container forming a guide tube, fixed to a flange connected to the clutch casing, the container comprising a central rotary motor element, so as to create an assembly or module which can be handled and carried.

In this arrangement the control means are mechanical and comprise, on the one hand, a driving part (a screw) carried by the container, fixed in translation and subjected to the action of the electric motor and, on the other hand, a driven part (a nut) fixed in rotation and subjected to the action of the driving part.

Means in the form of complementary ramps are provided on the driving and driven parts (screw and nut system), with displacement of the driven part relative to the supporting means.

Such an arrangement is more bulky axially than the conventional clutch release fork, which itself is very bulky, because the screw passes completely through the clutch release bearing and is engaged partly in the output shaft of the gearbox which is suitably bored out for this purpose.

Moreover, it cannot be employed in a clutch in which the control device is located between the engine and the gearbox and the input shaft of the gearbox passes through the control device, since the driving and driven parts are not able to fit into such an arrangement.

The object of the present invention is to overcome these disadvantages, by providing a new arrangement having mechanical control means in two parts with universal application, forming a compact assembly with the supporting means, whilst providing other advantages.

SUMMARY OF THE INVENTION

According to the invention, a control device of the kind described above is characterized in that the driving part and the driven part are hollow and are mounted coaxially; in that the driving part carries engagement means on its outer periphery for reciprocal engagement with the operating means, in that the driven part is mounted in the axial prolongation of the driving part, being connected in rotation to the supporting means by connecting means; and in that the driven part carries on its inner periphery a support portion for attaching the clutch release element to the control means.

As a result of the invention, the driven part may be carried and centred by the ramps of the driving part. It will be appreciated that the assembly is compact, since the driving part does not have to pass through the clutch release element.

Furthermore, the said element undergoes only a translation movement, which reduces wear and helps maintain self-centering especially when a clutch release bearing with continuous self-centering, as described in French Patent No. FR-A-1 467 848 is involved.

It will be understood that the size of the clutch release element can be reduced and is not determined by any guide. Moreover, the driven and driving parts can be generally used, the entry shaft of the gearbox being able to penetrate into the interior of these parts. In addition, space is freed at the outer periphery of the driving and driven parts, so that a wear preventer or a wear compensator, for example, may easily be included.

Advantageously, anti-friction means are provided between the ramps of the driving and driven parts. These may be, for example, ball bearings interposed between the ramps. Suitably, the driven part is carried directly by the driving part and the means for connecting in rotation consist of at least one circumferentially orientated elastic element. This enables the friction to be decreased further, as well as simplifying fabrication of the assembly by avoiding any jamming.

Advantageously, the driving part is carried on the supporting means by means of an anti-friction bearing, an oblique contact ball bearing for example. In this case the radial and axial forces are accommodated in the said roller bearing. As a result of this the driving part is always well balanced and the friction is further reduced.

The driven part may cap the driving part, having a U-shaped axial cross-section with a radial return for attaching the clutch release element, and reducing axial bulk.

The following description illustrates the invention by way of example with reference to the attached drawings.

BRIEF DESCRIPTION OF THE DRAWINGS

FIG. 1 is a front view of the control device according to the invention;

FIG. 2 is a view in section along the line II—II in FIG. 1;

FIG. 3 is a view in section along the line III—III in FIG. 1;

FIG. 4 is a view in section along the line IV—IV in FIG. 3;

FIG. 5 is an expanded view along the line V—V in FIG. 1 showing the engaged position of the clutch;

FIG. 6 is an identical view to FIG. 5 but for an intermediate position;

FIGS. 12 and 13 are analogous views to FIGS. 2 and 4 for another embodiment; and FIG. 14 is a schematic view expanded axially of the fourth embodiment of FIGS. 12 and 13, in the clutch engaged position.

DESCRIPTION OF THE PREFERRED EMBODIMENTS

Figure 8:
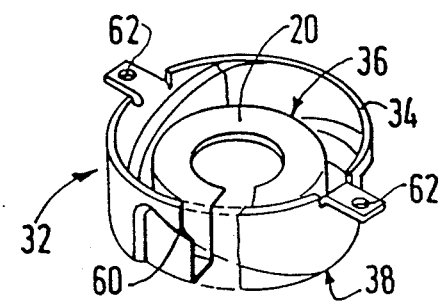
FIG. 8 is a view in perspective of the driven part.
Figure 11:
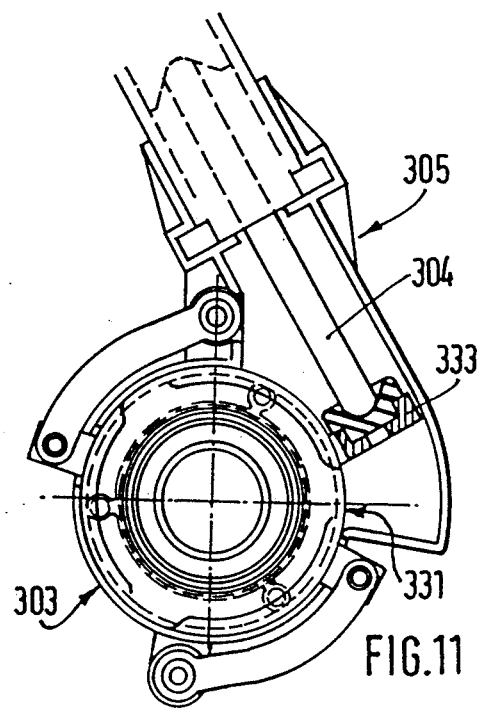
FIG. 11 is a view, partially in section, of a further alternative embodiment.

The Figures show a clutch release element 1, in this case a clutch release bearing, adapted to act on the release device of the clutch partially shown in FIGS. 8 and 12. The element 1 is positioned radially opposite the clutch release device by positioning means 2 and its translational displacement is controlled by control means 3. The said control means 3 are subjected to the tangential action of an operating means, for example a clutch cable 4 shown in FIGS. 1, 4 and 9, or a rod (FIG. 11).

In accordance with a characteristic of the invention, these separate elements are regrouped in a casing 51 constituting supporting means for the the clutch release element 1, and forming with the said casing a monoblock module 5 which can be handled and carried.

The casing 51 comprises a transverse flange 52 and an axially orientated wall 53 extending from it. It is partly closed by a cover 54 connected for example by clipping on the wall 53. The flange 52 comprises openings 56 to permit fixing means, such as screws, to pass through to translationally fix the module 5 to a fixed support, here the gearbox partially shown in FIG. 12. In the cover 54 an opening 57 (FIG. 2) associated with one of the openings 56 is provided for a tool to pass through. The cover 54 and the flange 52 have a central opening for the entry shaft of the gearbox.

During mounting on a vehicle (FIG. 1) it thus suffices to fasten the module 5 to the gearbox, and to attach the free end of the clutch cable 4 to the control device for the clutch, such as the clutch pedal or any other driving means controlled by the driver of the vehicle, or by a computer or similar automatic system.

The control means 3 comprise a driving part 31 and a driven part 32 one being disposed in the axial prolongation of the other in accordance with one characteristic of the invention. The said parts 31 and 32 are hollow and are mounted coaxially and staggered axially.

Figure 7:
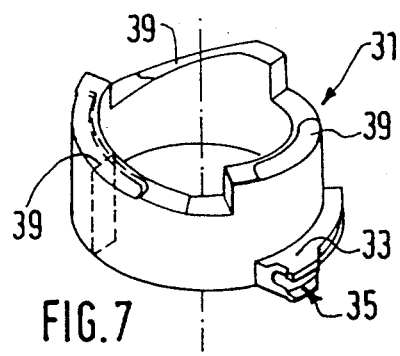
FIG. 7 is a view in perspective of the driving part.

The axially orientated driving part 31 (FIG. 7) has a generally hollow cylindrical shape and carries on its outer periphery a flange 33 extending over a reduced angular sector and shaped on its outer periphery into a groove 35 situated at a constant distance from the axis of the assembly. Cable 4 is positioned in this groove 35 and its free end is fixed by any known means 40 against a free radial edge of the flange 33.

The means 40 in this case consist of a bearing crimped onto the cable and fixed to the flange 33 by corresponding in shape to the flange and being engaged in the free end of the groove 35. In the present case the flange 33 is in one piece with the driving part 31, which thus carries engagement means 33, 35 at its outer periphery for reciprocal engagement with the operating means.

As shown in FIG. 4, cable 4 winds around the annularly shaped driving part 31 then departs from it tangentially. Consequently the force exerted by cable 4 on the part 31 is tangential, which enables entrainment in rotation of the part 31 around its axis. To facilitate this rotation, an anti-friction bearing is provided between the driving part and the flange 52.

In the present case this is a reaction roller bearing 37 having oblique contacts able to absorb the axial and radial loads which may be transmitted to the driving part 31. In practice, this is subjected, across the bearing 1 and the driven part 32, to the axial action of the clutch release device (shown in FIGS. 10 and 12). In addition, it is subjected to a radial action of the cable 4. It will be observed (FIG. 2) that the annular part 31 itself forms, at its end adjacent to the flange 52, one of the races of the roller bearing 37, and that it is provided with an axial return to form a narrow sealed channel of the roller bearing.

The part 31 may advantageously be obtained by moulding. The other race of the roller bearing 37 is formed by a shaped part housed in the flange 52.

The transverse face of the part 31 facing the cover 54 and turned towards the driven part 32 carries means in the form of ramps 39. These means consist here of helicoidal ramps changing the axial length of the driving part as a function of the circumferential position. In the present case three ramps 39 are provided, connected to one another by axial steps.

The driven part 32 (FIG. 8), likewise having an annular shape and being hollow, comprises two crowns 34, 36 coaxially directed axially and radially spaced in such a way that the driving part can penetrate axially into the free space delimited by them.

The two crowns 34, 36 are connected on the opposite side to the flange 52 turned towards the clutch release device by a bottom wall 38 shaped into ramps 60 complementary to the ramps 39. In the present case the ramps consist of three helicoidal ramps 60 starting from the base 38 and rising upwards in the direction of the free end of the outermost crown.

The part 32 is advantageously made out of sheet metal and thus has a U-shaped axial cross-section. Anti-friction means are provided between the ramps 39 and 60. In the present case these are ball bearings 70 which can be displaced along the ramps 39 and 60. These ball bearings 70, three in number, that is one per pair of ramps 39, 60, are held in place by a cage 71 presenting an axial prolongation 72 extending between the driving part 31 and the crown 36 in order to provide sealing by a narrow channel. Thus, the ramps 39, 60 are mounted end to end, the ramps 60 extending radially further towards the outside.

A narrow channel likewise exists between the outer crown 34 and the wall 53, so that the cover 54 does not need to cover the driven part entirely, but only the portion near the flange 33 being covered, as can be seen more clearly in FIG. 1.

It will be observed that the crown 34 partly covers the outer periphery of the driving part 31 and that the driven part is centred and guided by the driving part, being entrained by the latter, without contact with the wall 53.

At its opposite end to the base 38 the crown 34 comprises two diametrically opposite radial arms 62 directed outwards and enabling attachment of the tongues 63, 63'. These tongues, two in number in this case, are fastened by their other ends to a transverse flange 52 by a hollow rivet positioned in the opening 56 in the case of tongue 63, and in simple bearing on the said flange 52 in the case of tongue 63'. These tongues have generally circular-sector shapes and surround the driving part 31. They are inclined. Thus, as will be understood, tongue 63 forms means for connecting the driven part in rotation with the supporting means 51, whereas the other tongue 63' serves solely for storage to avoid any tipping of the driven part and for formation of an assembly which can be handled and carried within in the casing 51. The tongues 63, 63' contribute to the axial retention of the rotatable driven part.

The driven part 32 carries on its inner periphery a support portion for attaching the clutch release element 1. In this case it is a return 20 in the shape of a radial flange forming the means of positioning 2 of the bearing 1. The flange 20 is disposed at the opposite end of the crown 36 to the base 38 and extends radially towards the axis to reduce the axial bulk.

The bearing 1 is of the standard kind, being formed by a ball bearing 10, the inner race of which turns and presents a radial return to bear against the clutch release device, and the outer race does not turn but presents a radial flange 11 directed towards the axis to bear on the flange 20. The bearing 1 is hooked on to the flange 20 by axially acting elastic means 12. These means 12 consist of a plurality of axial lugs passing through the central opening of the flanges 11 and 20, one of the ends of which bears against the flange 20 and the other end of which is connected to an elastic inclined annular crown equipped with a pad to bear on the flange 20.

The external diameter of the bearing 1 is smaller than the internal diameter of the crown 36 in such a way that the clutch release bearing has a play in all directions of movement relative to the part 32 to self-centre it and to provide continuous self-centering as described in the document FR-A-1 467 848.

The device operates in the following way.

When, to release the clutch, the cable 4 is pulled in the direction of the arrow F (FIG. 4), the part 31 is entrained in rotation in the direction of the arrow F1 (FIG. 6). FIGS. 5 and 6 show the relative displacement of the parts 31 and 32 during the operation of releasing the clutch, FIG. 5 showing the clutch engaged position in which the bearing 1 is closest to the flange 52. When the driving part is entrained by the cable 4, the ramps 39 turn and the ball bearings 70 are displaced along the ramps 39 and 60, so that the driven part 32, fixed in rotation by means of the tongue 63, is translationally displaced in the direction of the arrow F2 away from the flange 52. As a result of this, the clutch release bearing 1 is not subjected to a rotational movement with a risk of destroying the self-centering.

It will be appreciated that friction is reduced to the minimum as a result of mounting two ball bearings in a cascade, one 37 having oblique contacts, the other 39, 60, 70 having ramps and oblique contacts.

The tongue 63 provides an elastic return of the part 32 towards the transverse wall 52 and holds the driving part translationally. Thus the driven part 32 is guided, centred and carried by the driving part 31 and indirectly provides the axial retention of the driving part 31. When it is desired to reengage the clutch, the tension on the cable 4 is cancelled and the driven part 32 is then returned to its initial position by the combined action of the tongues and of the clutch release device of the clutch.

It will be noted that in the engaged position of the clutch, the clutch release device of the clutch, usually a diaphragm, is in permanent contact with the clutch release bearing in such a way that it exerts a force on the driven part and contributes to the axial retention of the driving part through the intermediary of the ramps 39 and 60.

It will be appreciated that the control device according to the invention forms with the casing 51 a mechanical monoblock module with little axial bulk which can be mounted easily and quickly.

Figure 9:
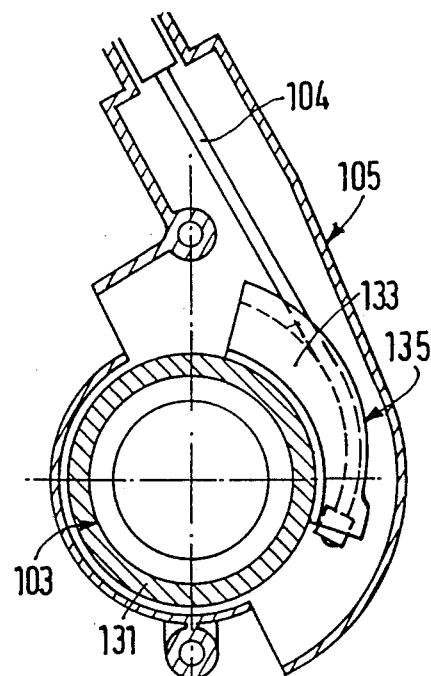
FIG. 9 is a view, similar to FIG. 4, of an alternative embodiment.

In FIG. 9 the parts already described in FIGS. 1 to 8 are given the same reference numbers increased by 100. Thus, the module is shown by 105 and the driving part by 131 with its transverse flange 133 in the shape of a sector. The groove 135 for mounting the cable 104 is not at a constant distance from the axis, being furthest away from the axis near the opposite circumferential end of the flange 133 to the anchoring point of the cable 104.

Figure 10:
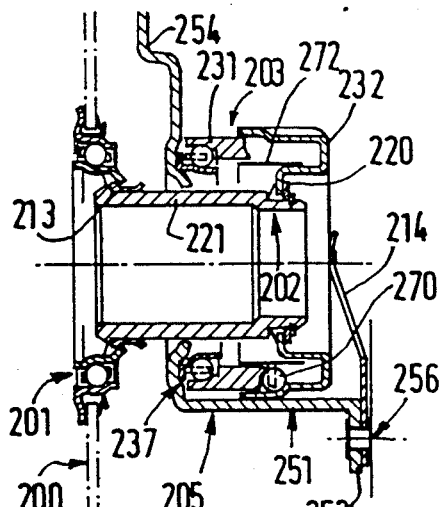
FIG. 10 is a partial view corresponding to FIG. 2 for another alternative embodiment.

As a result of this, the pull of the cable 104 during the clutch release operation is first exerted over a large radius and then over a smaller radius which enables, with a constant force on the pedal, a larger force to be exerted on the control means 103 at the start of the operation. This effect of variable scaling down may likewise be obtained by varying the angle of the ramps from one of their ends to the other. FIG. 10 shows an alternative embodiment adapted for the control of a bearing not acting by pushing, as in FIGS. 1 to 8, but by traction on the clutch, and in it the parts in FIGS. 1 to 8 are referred to by their numbers increased by 200. The driven part 232 is displaced translationally moving further away from the clutch release device 200 during a clutch release operation.

The positioning means 202 are formed by a radial flange 220 fixed to the part 232 to which is attached a tubular part 221. A radial play exists between the part 221 and the flange 220. The part 221 is connected to the flange 220 by a self-centering connection by means of a Belleville washer bearing on the part 221 to drive the flange 220 against a washer wedged axially by a circlip on the part 221. The bearing 201 is attached to the clutch release device 200, in this case the ends of the fingers of a diaphragm, and is hooked to the tubular part 221 by a clipping mounting employing an elastic retaining element 213. A spring 214 is provided between the transverse flange 252 and the part 232 in order to push the latter towards the clutch release device 200. The spring 214 exerts a larger force than the force necessary for the clipping on, its action on the control means enabling, during assembling, the automatic fixing of the positioning means 202 to the bearing. In an alternative, which is not shown, the bearing 201 may be fixed to the part 221 and be attached to a fitting part connected to the clutch release device.

It will be noted that the relative position of the driving and driven parts is reversed, the driving part being the closer to the clutch release device 200. In FIG. 11 the cable is replaced by a rod 304 pushing on a flange 333 fixed to the driving part 331. The displacement of this rod 304 is controlled by a hydraulic jack situated in a part upstream from the clutch release control. It will be noted that the flange 333 extends radially and that it is provided with a recess to house a block of elastomer interposed between the rod 304 and the said flange. In this embodiment the two tongues are fastened to the transverse flange of the module 305.

Thus, as emerges from the description and the drawings, the roller bearing 37, 237 having oblique contacts is disposed radially beyond the flange 20, 220 forming a protective screen, so that a good seating is obtained for the control means, the said roller bearings withstanding the oscillatory movements engendered by the diaphragm the fingers of which are not all in the same plane. It will be noted that the module 5, 205 may be supplied fitted with or without the clutch release bearing 1.

Of course the invention is not limited to the embodiments described and shown. For example, it is possible to replace the tongues 63 by a grooved mounting between the axial wall 53 and the part 32 to hold the driven part 32 in rotation, or by any other mounting making complementary shapes cooperate.

As shown in dotted lines in FIG. 4, it is possible to fasten a spring blade on the supporting means 51 and to connect the said blade to an indicator lamp which will light when the circumferential end of the flange 33 comes into contact with the said blade to detect wear; the cable 4 may advantageously serve to supply electricity.

The clutch release element may not necessarily comprise a ball bearing and may be equipped with a race constituted by a mixture of thermoducible resin, lubricating additives and synthetic fibres, as described in the document FR-A-2 499 646. Likewise the ramps 60, 39 may be made of a different material to the parts to which they are fixed and may be constituted of a mixture based on Teflon forming an anti-friction means.

The outer race of the bearing 1 may be movable and the inner race fixed. In this case the flange 20 may be prolonged by by an axial return to obtain an arrangement similar to FIG. 3 in French patent No. FR-A-1 467 848.

The driving part may be toothed on the outside to mesh with a toothed wheel of a gearing down device driven by an electric motor. As shown in FIGS. 12 and 13 the module may be equipped with a wear compensating device. In this alternative embodiment, the elements analogous to those in the embodiment in FIG. 1 bear the same reference numbers increased by 500. The driving part 531 carries a part 600 freely in rotation. The flange 533 carries a toothed ratchet 601 passing through an opening 602 made in the part 600 to mesh with the teeth comprised on the outside of the part 531. A spring 603 bears on the parts 600, 533 and drives the ratchet 601 towards the part 531 to engage therewith. The flange 533 is pivotably mounted on the part 600 which is hollowed out for this purpose.

A spring 604 is interposed axially between the part 600 and a shoulder 605 of the driven part. It enables the bearing to bear continuously against the diaphragm 500, mounted in a pivoting manner on the cover 610 of the clutch by the lugs 611 arising from the latter.

It bears on a pressure plate 612 to clamp a friction disc (not shown) integrally in rotation with the entry shaft of the gearbox 614. A part of the gearbox is shown by 615, and 616 indicates an intermediate part fastened on the gearbox and on which the flange 552 becomes engaged with a centering effect due to the bosses 617.

It will be noted that in this embodiment the flange 552 presents an axial return 620 on which the inner race of the ball bearing having oblique contacts 537 becomes engaged, the outer race of the bearing being constituted by the driven part itself. The elastic means 512 consist of a corrugated washer bearing on the flange 520 and equipped with axial lugs passing through the central opening of the flanges 520, 511, each of the regions between the corrugations presenting at its end a hook which bears on the flange 511 as described with reference to FIG. 8 in French Patent No. FR-A-2 337 281.

Finally, 630 indicates clipping means in the form of hooks and teeth provided between the cover 554 and the wall 553 both advantageously made of plastic. It will be noted that the disposition of the tongues 533 is identical to that in FIG. 11.

Referring to FIG. 14, it can be seen that in the clutch engaged position, the ratchet 601 is not in contact with the teeth of the driving part 531 because it bears on a bearing 631 in the form of an inclined corner (FIG. 13) of the wall 553 of the casing 551.

In the clutch released position the action of the cable, reinforced by the action of the spring 603 equipped with a central lug covering the groove of the pivoting flange 533 and with two lateral lugs bearing on the flange 533 on either side of the groove, enables tipping of the ratchet 601 as a result of the movement away of the flange 533 relative to the bearing 631. It will be noted that the flange 533, for its pivoting, is equipped on either side of its groove with circular spurs 632 cooperating with the outer periphery of the part 600 provided with a flat recessed part connected by a ramp to the main part of the outer periphery of the said part 600.

The spring 603 possesses a radial return equipped with a central opening in which the bearing 540 of the cable engages, the said return bearing at its end on the part 600.

In an alternative (not shown) the part 600 may be notched to receive the spurs of the flange 533 enabling tipping of the ratchet 601 and producing meshing of the latter with the teeth of the part 531. With wear the diaphragm 500 exerts a force on the bearing which is transformed into a rotational movement of the part 531 as a result of the ramp, and this enables wear adjustment to be obtained.

Thus, as will be understood, the axial return 620 permits good accommodation of radial forces. In these conditions it is possible to replace the ball bearing by an anti-friction bearing, based on Teflon for example.

It will be noted that the axial retention of the driving part may be provided by the roller bearing 537 itself. For example, the inner race may be mounted such that it is translationally fixed on the return 620 and the flange 552. In this case the race presents a small step so that the driving part is mounted by a clipping action.

Finally, it will be noted that the control device according to the invention may be mounted at the end of the entraining assembly as described in European Patent No. EP-A-0 199 642, being fixed on the translationally fixed case of the clutch. In this case, the flange 52 may be closed, the driving and driven parts being of the kind described above.

What is claimed is:

1. A control device for a clutch suitable for an automobile vehicle, of the kind adapted to operate a clutch release element intended to act on a release bearing of the clutch, comprising support means for said clutch release element adapted to be fixed to a translationally fixed support, control means carried by the support means and comprising, on the one hand, a driving part carried by the support means which driving part is fixed in translation and movable in rotation and which is adapted to be subjected to operating means; and a driven part movable in translation and fixed in rotation, adapted to act on the clutch release element; wherein means having complementary ramps are provided respectively on the driven part and on the driving part for the entrainment of the driven part by the driving part and axial displacement of said driven part relative to the supporting means; and wherein the driving part and the driven part are hollow and are mounted coaxially, the driving part carrying engagement means on the outer periphery thereof for reciprocal engagement with the operating means and said driving part having an axial portion; and wherein the driven part is mounted in the axial prolongation of the driving part, and is connected in rotation to the supporting means by connecting means, said driven part carrying on an inner periphery thereof a support portion for connecting the clutch release element to the control means.

2. A device according to claim 1, wherein the end transverse face of the driving part facing the driven part is formed with ramps, and the driven part has an annular shape and comprises two crowns coaxially directed and radially spaced in such a way that said driving part extends between said crowns.

3. A device according to claim 2, wherein said two crowns are connected by a base from which said ramps extend upwardly in the direction of the free end of the outermost crown, said ramps having a complementary shape to that of said driving part.

4. A device according to claim 3, wherein ball bearings are interposed between the ramps of the driving and driven parts.

5. A device according to claim 1, wherein the driving part is mounted on supporting means through the intermediary of a roller bearing with oblique contacts.

6. A device according to claim 1, wherein said means for locking in rotation consist of at least one inclined tongue.

7. A device according to claim 6, wherein said tongue has a pair of opposed ends and surrounds the driving part and is fastened at one of its ends to the supporting means and at the other of its ends to a radial arm projecting from said driven part.

8. A device according to claim 1, wherein said engagement means consists of a groove in the outer periphery of a flange carried by the driving part and extending over an angular sector to receive a cable.

9. A device according to claim 8, wherein said flange carries a toothed ratchet pivotably mounted on a part carried by the driving part, said part comprising an opening for the ratchet adapted to cooperate with the teeth of the driving part.

10. A device according to claim 8, wherein said groove extends over a variable distance relative to the axis of the assembly.

11. A device according to claim 1, wherein said supporting means comprise a supporting flange having an axial wall and a cover connected to said wall.

* * * * *